(12) United States Patent
Sankar et al.

(10) Patent No.: US 10,585,762 B2
(45) Date of Patent: Mar. 10, 2020

(54) MAINTAINING FILES IN A RETAINED FILE SYSTEM

(71) Applicant: HEWLETT PACKARD ENTERPRISE DEVELOPMENT LP, Houston, TX (US)

(72) Inventors: Arun Sankar, Bangalore (IN); Jagadish Madhu, Bangalore (IN); Ramesh Kannan Karuppasamy, Bangalore (IN); Rajkumar Kannan, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 144 days.

(21) Appl. No.: 15/305,179

(22) PCT Filed: Oct. 7, 2014

(86) PCT No.: PCT/US2014/059429
§ 371 (c)(1),
(2) Date: Oct. 19, 2016

(87) PCT Pub. No.: WO2015/167603
PCT Pub. Date: Nov. 5, 2015

(65) Prior Publication Data
US 2017/0220426 A1    Aug. 3, 2017

(30) Foreign Application Priority Data
Apr. 29, 2014   (IN) .......................... 2173/CHE/2014

(51) Int. Cl.
*G06F 17/30* (2006.01)
*G06F 11/14* (2006.01)
(Continued)

(52) U.S. Cl.
CPC ...... *G06F 11/1469* (2013.01); *G06F 11/1004* (2013.01); *G06F 11/1012* (2013.01);
(Continued)

(58) Field of Classification Search
CPC ............. G06F 11/1012; G06F 11/1435; G06F 11/1469; G06F 17/30076; G06F 17/30085; G06F 17/30371; G06F 21/64
See application file for complete search history.

(56) References Cited

U.S. PATENT DOCUMENTS 6,178,536 B1   1/2001  Sorkin
6,292,795 B1   9/2001  Peters et al.
(Continued)

OTHER PUBLICATIONS

Steven Poitras, "The Nutanix Bible," Feb. 11, 2014, pp. 1-39 (online), Retrieved from the Internet on May 1, 2018 at URL: <web.archive.org/web/20140211222201/http://stevenpoitras.com:80/the-nutanix-bible>.
(Continued)

*Primary Examiner* — Yuk Ting Choi
(74) *Attorney, Agent, or Firm* — Hewlett Packard Enterprise Patent Department

(57) ABSTRACT

To maintain files in a retained file system, a run-time error detection code (EDC) is generated for a retained file. The run-time EDC is generated on the basis of at least one of entire content and metadata of the retained file. Further, the run-time EDC is compared with a validation EDC associated with the retained file to identify a corruption of the retained file. The validation EDC is generated at an instance of placing the retained file in the retained FS. Furthermore, the validation EDC is based on at least one of entire content and metadata of the retained file. Based on the comparison, an original version of the retained file may is restored from a trusted backup system.

14 Claims, 5 Drawing Sheets

(51) Int. Cl.
*G06F 16/11* (2019.01)
*G06F 16/23* (2019.01)
*G06F 11/10* (2006.01)

(52) U.S. Cl.
CPC .......... *G06F 16/116* (2019.01); *G06F 16/125* (2019.01); *G06F 16/2365* (2019.01); *G06F 2201/84* (2013.01)

(56) References Cited

U.S. PATENT DOCUMENTS

| | | | |
|---|---|---|---|
| 7,672,979 | B1* | 3/2010 | Appellof ............ G06F 11/1435 707/649 |
| 7,739,233 | B1 | 6/2010 | Ghemawat et al. |
| 7,814,074 | B2 | 10/2010 | Anglin et al. |
| 7,836,387 | B1 | 11/2010 | Wong et al. |
| 7,895,501 | B2 | 2/2011 | Brown |
| 8,060,812 | B2 | 11/2011 | Branda et al. |
| 8,266,113 | B2 | 9/2012 | Radatti |
| 8,352,438 | B1 | 1/2013 | Kennedy |
| 8,473,461 | B1 | 6/2013 | Woirhaye et al. |
| 8,612,398 | B2 | 12/2013 | Jarrett et al. |
| 8,886,995 | B1* | 11/2014 | Pallapothu ......... G06F 11/1471 714/15 |
| 8,931,054 | B2 | 1/2015 | Huynh et al. |
| 8,984,363 | B1* | 3/2015 | Juels .................... H04L 9/3221 714/752 |
| 9,424,130 | B2 | 8/2016 | Resch et al. |
| 9,697,268 | B1 | 7/2017 | Prater et al. |
| 9,740,583 | B1 | 8/2017 | Brandwine |
| 9,767,106 | B1 | 9/2017 | Duggal et al. |
| 2004/0230885 | A1* | 11/2004 | Newcombe ......... H03M 13/093 714/758 |
| 2007/0179990 | A1 | 8/2007 | Zimran et al. |
| 2007/0208918 | A1* | 9/2007 | Harbin ................ G06F 11/1451 711/162 |
| 2007/0294321 | A1 | 12/2007 | Midgley et al. |
| 2008/0071867 | A1 | 3/2008 | Pearson et al. |
| 2010/0106689 | A1 | 4/2010 | Huslak |
| 2010/0179941 | A1 | 7/2010 | Agrawal et al. |
| 2011/0099148 | A1 | 4/2011 | Bruning, III |
| 2011/0145527 | A1* | 6/2011 | Miller .................... G06F 9/466 711/162 |
| 2011/0153578 | A1 | 6/2011 | Pogodin |
| 2012/0239630 | A1 | 9/2012 | Wideman et al. |
| 2012/0239778 | A1 | 9/2012 | Wang |
| 2012/0303593 | A1 | 11/2012 | Calder et al. |
| 2012/0317079 | A1 | 12/2012 | Shoens et al. |
| 2013/0007366 | A1 | 1/2013 | Garmiza et al. |
| 2013/0054523 | A1 | 2/2013 | Anglin et al. |
| 2013/0066952 | A1 | 3/2013 | Colrain et al. |
| 2013/0103981 | A1 | 4/2013 | Zheng |
| 2013/0138607 | A1 | 5/2013 | Bashyam et al. |
| 2013/0166862 | A1 | 6/2013 | Huang |
| 2013/0173547 | A1 | 7/2013 | Cline et al. |
| 2013/0325824 | A1 | 12/2013 | Shoens |
| 2014/0006858 | A1* | 1/2014 | Helfman ............ G06F 11/1448 714/19 |
| 2014/0074777 | A1 | 3/2014 | Agrawal |
| 2014/0195636 | A1 | 7/2014 | Karve et al. |
| 2014/0201153 | A1 | 7/2014 | Vijayan et al. |
| 2014/0281302 | A1* | 9/2014 | Horn .................... G06F 3/0656 711/161 |
| 2016/0150012 | A1 | 5/2016 | Barszczak et al. |
| 2016/0294788 | A1 | 10/2016 | Mahajan et al. |
| 2017/0193004 | A1 | 7/2017 | Karuppusamy et al. |

OTHER PUBLICATIONS

Estsoft Corporation, "Automatically Repair Damaged Archives," (Web Page), retrieved on Mar. 13, 2014, 2 pages, available at http://www.altools.com/ALTools/ALZip/Features/Test-Repair.aspx.
International Search Report & Written Opinion received in PCT Application No. PCT/US2014/059429, dated Feb. 25, 2015, 10 pages.

* cited by examiner

MAINTAINING FILES IN A RETAINED FILE SYSTEM

BACKGROUND

Preservation of data has become a priority for most organizations. For this, organizations generally have backup systems that allow users to restore data which may have gone corrupt due to, for example, failure of a component, human error, software corruption, or some other error. Also, there may be some data that the organizations may want to retain for a predefined period of time. Once selected for retention, the data cannot be destroyed and is to be maintained in a retrievable form for the predefined period of time. The predefined time period is referred to as a retention period. The retention period generally depends on the type of data and the purposes for which it is retained and is defined by business policies, legal regulations, or user preferences.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components.

DETAILED DESCRIPTION

Figure 1A:
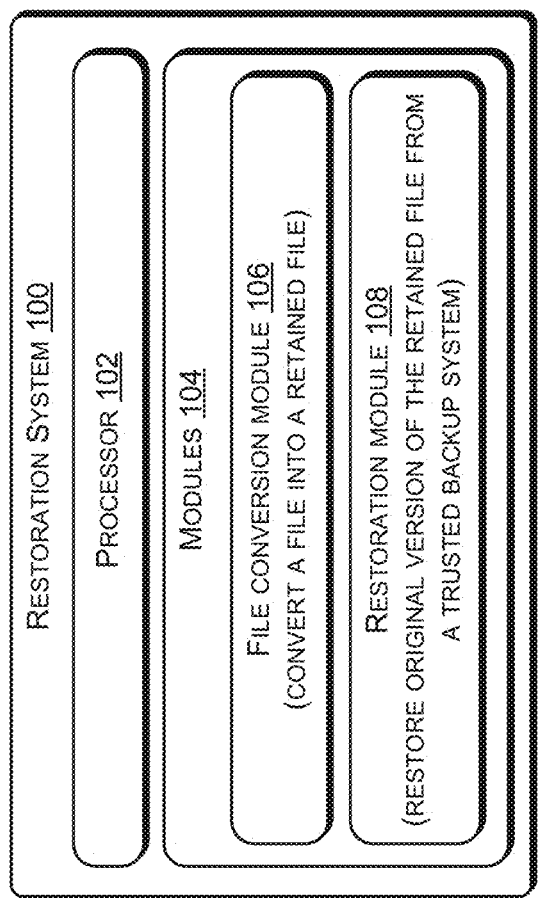
FIG. 1A illustrates components of a restoration system, according to an example of the present subject matter.

Organizations often retain data for a retention period that may be defined by various statutes or any other policies or regulations. In order to retain data, organizations generally set up backup systems or may replicate the data to be retained in a remote location, such as in a storage server, as per the retention policy. The retained data is to be maintained in a retrievable form for the retention period which is generally substantially long. However, during the retention period, the retained data may not be accessed for long intervals of time and may get corrupted, i.e., there may be unintended changes in the retained data, for example, due to errors on disk drive, malicious attacks, failure of disk drive, or any other reasons.

Generally, to ensure integrity and validity of the retained data, organizations may perform periodic checks on the retained data. For example, every once in a while, the hash of some portions of content of a retained file may be generated and compared with a previously stored hash of the same portion of an original version of the retained file to detect a corruption in the retained file. The original version may be understood a version of the retained file before being converted in to the retained file. In case, the retained file undergoes modifications at portions other than the portions used to generate the hash, such corruption of the retained file may not be detected. Further, based on the comparison, if the retained file is detected to be corrupt, a system administrator may have to manually delete the corrupted retained file from the backup system. In addition, to restore the original version of the corrupted retained file, the system administrator may manually run commands in the file system. Such a manual process is time consuming and error prone, since the volume of retained data and in turn number of corrupted retained files is generally high.

According to various examples, systems and methods for maintaining files in a retained file system (FS) is disclosed. A restoration system of the present subject matter automatically recovers an original version of a corrupted retained file from a trusted backup system that may be associated with the retained FS. A retained file may be understood as a file on which a retention policy is applied and is therefore retained in the retained FS. In an example, the retention policy may be based on various statutes, policies, or regulations, and accordingly the files may be retained such that retained files comply with the regulations. For example, the content and metadata associated with the retained file may be non-modifiable.

When a file is retained, the restoration system may generate a validation error detection code (EDC), such as a checksum, for the file, at an instance of placing the file into the retained FS. In an example, the validation EDC may be generated for an entire content of the retained file as well as the metadata associated with the retained file. Further, an original version of the retained file may be stored as a backup copy in the trusted backup system. In an example, the backup copy is stored at the instance when the file is converted into the retained file, i.e., when the file is placed in the retained FS. The backup copy may be stored instantly along with the retained file, for example, to ensure that the original version may not be further modified or does not get corrupted.

The restoration system may periodically check integrity of the retained file at predefined time intervals. To do so, the restoration system may generate a run-time EDC for the retained file to compare the same with the validation EDC of the corresponding file. In case the run-time EDC of the retained file is different from the validation EDC, the retained file may be detected to be corrupt.

To restore the original version of the corrupted retained file, the restoration system may invoke a backup plug-in that may be coupled to the trusted backup system. The backup plug-in may be authorized to restore an original version of the corrupted retained file from the trusted backup system without human intervention. In an example, the restoration system may maintain an audit trail of various actions that are performed with reference to the retained FS. Further, the restoration system may generate a report including information pertaining to various actions performed in the retained FS.

In accordance with the examples of the disclosed system and methods, the validation EDC may be generated by encoding at least one of the entire content of the retained file or the metadata associated with the retained file. Thus, the data integrity of retained files can be verified with enhanced accuracy thereby allowing timely restoration of corrupted retained files. Further, the restoration system provides for maintaining retained files in an efficient manner, by automatically restoring the original version corresponding to the identified corrupted retained files through the trusted backup system.

The various systems and the methods are further described in conjunction with the following figures. It should be noted that the description and figures merely illustrate the principles of the present subject matter. Further, various arrangements may be devised that, although not explicitly described or shown herein, embody the principles of the present subject matter and are included within its scope.

The manner in which the systems and the methods for maintaining files in a retained file system are implemented are explained in details with respect to FIG. 1A, FIG. 1B, FIG. 2A, FIG. 2B, and FIG. 3. While aspects of described systems and methods for maintaining files in the retained file system can be implemented in any number of different computing systems, environments, and/or implementations, the examples and implementations are described in the context of the following system(s).

FIG. 1A illustrates the components of a restoration system 100, according to an example of the present subject matter. In one example, the restoration system 100 may be implemented as any computing system, such as a desktop, a laptop, a mailing server, and the like. In another example, the restoration system 100 can be implemented in any network environment comprising a variety of network devices, including routers, bridges, servers, computing devices, storage devices, etc.

In one implementation, the restoration system 100 includes a processor 102 and modules 104 coupled to the processor 102. The processor 102 may include microprocessors, microcomputers, microcontrollers, digital signal processors, central processing units, state machines, logic circuitries, and/or any other devices that manipulate signals and data based on computer-readable instructions. Further, functions of the various elements shown in the figures, including any functional blocks labeled as "processor(s)", may be provided through the use of dedicated hardware as well as hardware capable of executing computer-readable instructions.

The modules 104, amongst other things, include routines, programs, objects, components, and data structures, which perform particular tasks or implement particular abstract data types. The modules 104 may also be implemented as, signal processor(s), state machine(s), logic circuitries, and/or any other device or component that manipulates signals based on operational instructions. Further, the modules 104 can be implemented by hardware, by computer-readable instructions executed by a processing unit, or by a combination thereof. In one implementation, the modules 104 include a file conversion module 106 and a restoration module 108.

In one example, the file conversion module 106 may convert a file to a retained file. A file may be understood as any computer generated document, content and metadata of which are modifiable by users. For example, the file may be a medical record, employee details, a legal document, and the like. A retained file, in the present context, may be understood as a file which may be retained, for example, in a database based on a retention policy. Therefore, the conversion of the file into the retained file may be understood as changing properties of a file, such that the properties become non-modifiable. For example, upon conversion of a file, the metadata of the file that may have previously been modifiable may be made non-modifiable. Accordingly, properties, such as a type of the file or the location of the file may not be modified. Additionally, in one example, upon conversion, the content of the file may also be made non-modifiable. The retained file may be accessible by users, such that the content may be viewable but could not be edited.

The retention policy defines terms of retention of the file, such as a retention period for the file, access right that may be associated with the file during the retention period. Different retention policies may be applied on different files based on the data included in the file. As mentioned previously, the retention policies may be defined to meet statutory norms and regulations. For example, for a medical record, a retention period of 10 years may be defined in the retention policy. Therefore, the medical record cannot be removed from the database until expiration of the retention period.

A retained file remains accessible to the users; however, the content and metadata associated with the retained file cannot be modified by the users and may be modified in accordance with the retention policy, for example, by an administrator of the restoration system 100. Further, the retained files have to be maintained in compliance with regulations as defined in the retention policy and any modification or attempt to take backup or restore the retained file can be audited for regulatory purposes.

In one example, to convert a file to a retained file, the file conversion module 106 may select the file from a plurality of files that are stored in a file system (FS), associated with the restoration system 100, for example, based on an input provided by a user or the administrator of the restoration system 100. In an example, the file conversion module 106 may select the file based on a predefined rule. For instance, based a policy of the organization, a predefined rule may dictate that if a file remains inactive for a certain time, say 1 year, the file can be retained. The selected files may be retained and may be stored in a retained FS.

Further, at an instance of conversion of the file into the retained file, the file conversion module 106 may generate a validation error detection code (EDC). The validation EDC may be understood as a checksum that may be generated for the retained file. In accordance with one example of the present subject matter, the file conversion module 106 may generate the validation EDC by encoding entire content of the retained file. Since, the validation EDC is based on the entire content of the retained file, the validation EDC may facilitate in determining integrity of the retained file in an efficient manner by detecting modifications that may occur at any portion of the retained file. In addition, to avoid any modification in the metadata of the retained file, the file conversion module 106 may generate the validation EDC for the metadata as well. The metadata associated with the retained file may include details, such as name of retained file, last date of modification of the retained file, and location of the retained file in the retained FS. In an example, a single validation EDC may be generated for the entire content and the metadata of the retained file. In another example, separate validation EDCs, one for the entire content and the other for the metadata, may be generated for the retained file. In an example, the validation EDCs may be stored along with the retained file in the retained FS. In another example, the validation EDCs may be stored in a database that may be associated with the restoration system 100.

In an example, the validation EDC may be used for checking validity and integrity of the retained file, when the retained file is accessed at a later point in time. For instance, the retained file may be accessed periodically during the retention period to check the validity of the retained file and detect corruption, if any, in the retained file in a timely manner. For example, the validation EDC may be used to determine whether the retained file has become corrupt or not. A restoration policy implies to restoration of an original version of a corrupted retained file from a trusted backup system, such as a tape library, a disaster recovery site, and a third party vendor. The restoration policy may be pre-defined, for example, by the administrator of the restoration system 100 and may be stored in the database. In case the restoration policy is applicable on the retained file, the restoration module 108 may restore an original version of the retained file from the trusted backup system. The process of determination of corrupted retained files and their restoration in the restoration system 100 is described in greater detail in conjunction with FIG. 1B.

Figure 1B:
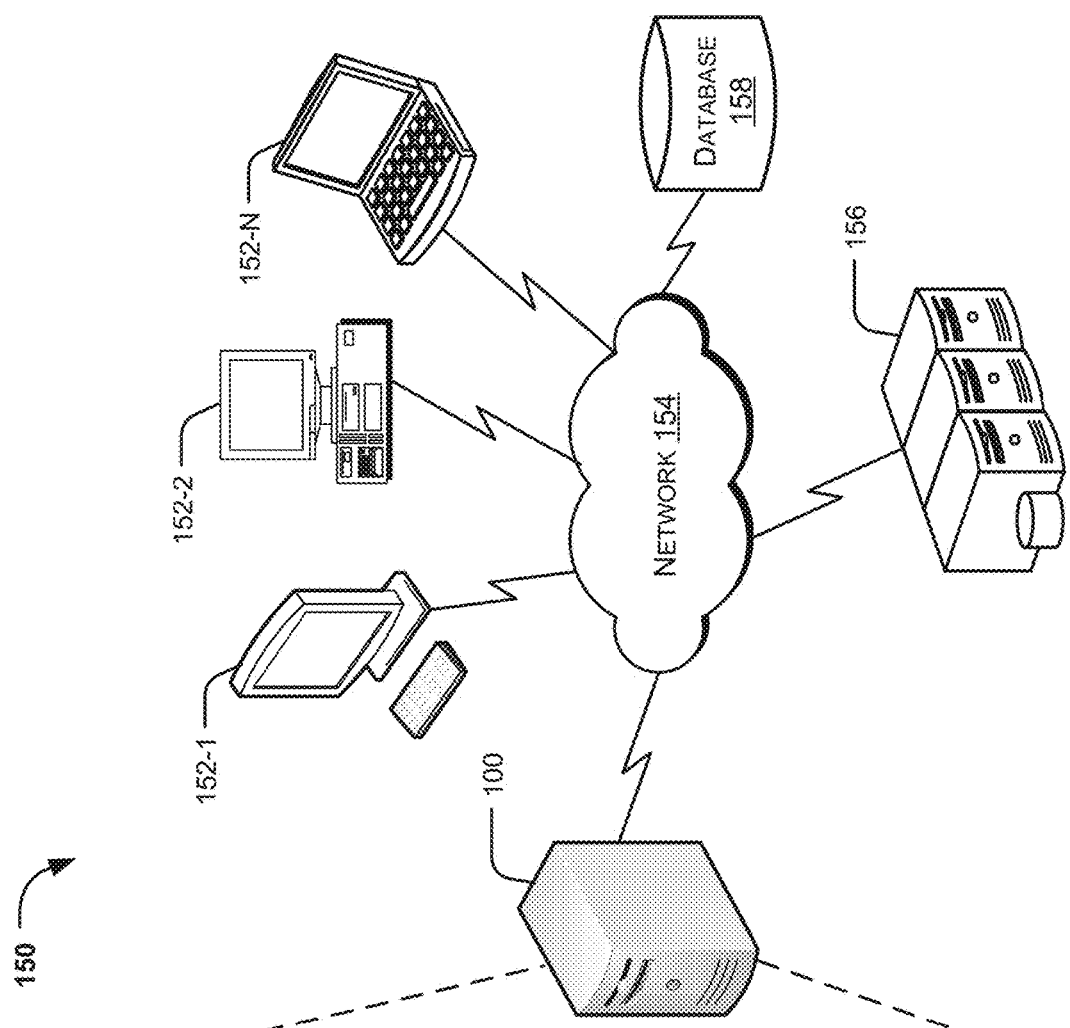
FIG. 1B illustrates a network implementation of the restoration system, according to another example of the present subject matter.
Figure 1B:
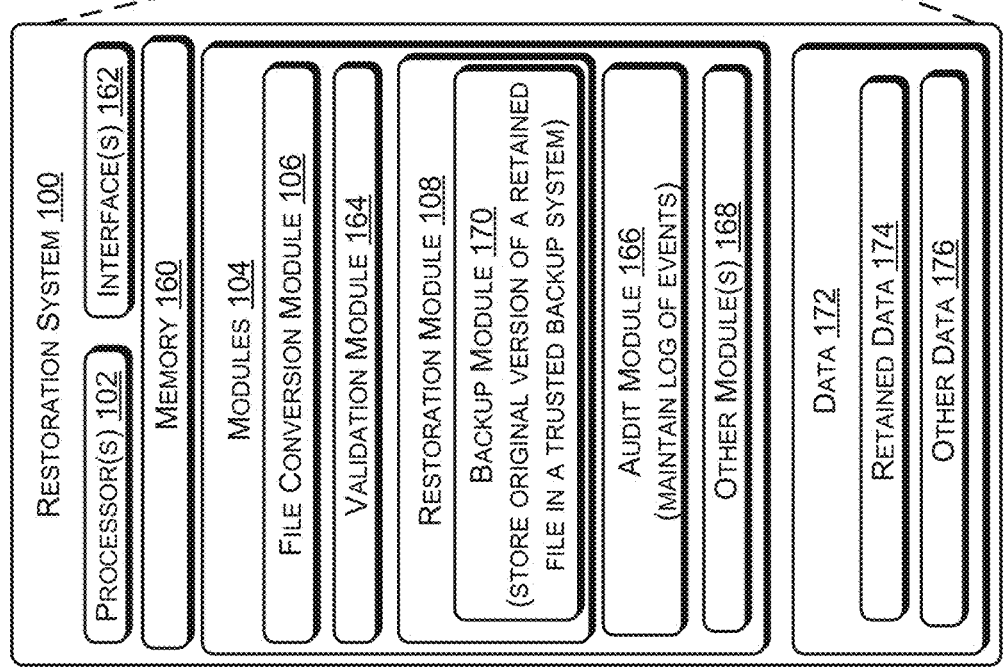

FIG. 1B illustrates a network environment 150 including the restoration system 100 according to another example of the present subject matter. As mentioned previously, the restoration system 100 may be implemented in various computing systems, such as personal computers, servers, and network servers. The restoration system 100 may be implemented on a stand-alone computing system or a network interfaced computing system. For example, for the purpose of maintaining files, in the network environment 150, the restoration system 100 may communicate with a plurality of user devices 152-1, 152-2, . . . , 152-N over a network 154. The user devices 152-1, 152-2, . . . , 152-N, can be referred to as user devices 152, and individually referred to as a user device 152, hereinafter. The user devices 152 can include, but are not restricted to, desktop computers, laptops, and the like. In an implementation, a plurality of users operating the user devices 152 may provide files that may be stored in the user devices 152 to the restoration system 100 for being retained.

In one example, the restoration system 100 may be coupled to a trusted backup system 156. The trusted backup system 156 may act as a backup for files retained in the restoration system 100. In an example, the trusted backup system 156 may provide for restoration of the retained files, such as in an event of the retained file going corrupt. The trusted backup system 156 may include any suitable secondary storage device for maintaining a backup copy of the retained files. The secondary storage devices may include, but are not limited to, a disk storage, a tape storage system comprised of one or more tape drives and tape cartridges, an optical disk library, a disaster recovery (DR) site, and an independent software vendor (ISV) based backup. Though not depicted in the illustrated example, in an example, the trusted backup system 156 may be a storage area network (SAN) or a cloud based storage.

Further, the administrator may deploy the trusted backup system 156 with the restoration system 100. In an example, the trusted backup system 156 may be plugged with the restoration system 100. The trusted backup system 156 may be authorized to restore an original version of a corrupted retained file.

In an implementation, the restoration system 100 may be coupled to a database 158 over the network 154 or any other network in the network environment 150. Although not shown in the figure, the database 158 may also be directly connected to the restoration system 100. In an example, the database 158 holds that data which helps the restoration system 100 in maintaining the retained FS. For example, the database 158 may be used for storing a file received, from the user devices 152, for being retained in the restoration system 100, a retention policy associated with the retained files, the validation EDC generated for a retained file may also be stored in the database 158. In an example, the database 158 may be provided as a relational database and may store data in various formats, such as relational tables, object oriented relational tables, and indexed tables. The database 158 may also be provided as other types of databases, such as operational databases, analytical databases, hierarchical databases, and distributed or network databases. In the present implementation, the database 158 may be an express query (EQ) database for storing information pertaining to the trusted backup system 156, information pertaining to retained files, details about restoration policies that may be applicable on the retained files, and the like.

In an implementation, the restoration system 100 includes the processor 102 and a memory 160 connected to the processor 102. The memory 160, communicatively coupled to the processor 102, can include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The restoration system 100 also includes interface(s) 162. The interfaces 162 may include a variety of interfaces, for example, interfaces 162 for user device(s), such as the user devices 152, the backup storage system 156, and network devices of the network 154. The interface(s) 162 may include data input and output devices, referred to as I/O devices. The interface(s) 162 facilitate the communication of the restoration system 100 with various communication and computing devices and various communication networks, such as networks that use a variety of protocols, for example, Hypertext Transfer Protocol (HTTP) and Transmission Control Protocol/Internet Protocol (TCP/IP).

Further, in addition to the file conversion module 106 and the restoration module 108, the modules 104 may include a validation module 164, an audit module 166, and other module(s) 168. The other module(s) 168 may include programs or coded instructions that supplement applications or functions performed by the restoration system 100. Further, the restoration module 108 may include a backup module 170. The backup module 170 may be authorized to perform any interaction with the trusted backup system 156, such as for storing and restoring original versions of the retained files. The modules 104 may be implemented as described in relation to FIGS. 1A and 1B.

In an example, the restoration system 100 includes data 172. The data 172 may include retained file data 174, and other data 176. The other data 176 may include data generated and saved by the modules 104 for implementing various functionalities of the restoration system 100.

In an example, the file conversion module 106 may automatically identify if any file stored in the user devices 154 is eligible for being retained. For example, based on the content and format of a file, the file conversion module 106 may identify and retrieve the file from the user devices 154 for retention. For example, if a file contains medical records of patients, legal information, call records, financial data, and the like, the file conversion module 106 may retrieve those files for retention. In an implementation, the files may be selected for retention based on internal policies of an organization. For example, if a file is inactive for a certain period of time, say 1 year, the user devices 154 may select the file for retention.

In an example, the file conversion module 106 may convert a file into a retained file. Therefore, the conversion of the file into the retained file may be understood as changing properties of a file, such that the properties become non-modifiable. For example, upon conversion of a file, the metadata of the file that may have previously been modifiable may be made non-modifiable. Accordingly, properties, such as a type of the file or the location of the file may not be modified. Additionally, in one example, upon conversion, the content of the file may also be made non-modifiable. The retained file may be accessible by users, such that the content may be viewable but could not be edited. The file conversion module 106 may store the retained files in the retained FS and may store the retained files in the restoration system 100 as retained data 174. The retained data 174 may thus include the data that pertains to the retained FS. Further, at an instance of conversion of the file into the retained file, the file conversion module 106 may generate a validation EDC for the retained file. To generate the validation EDC, the file conversion module 106 may encode both the content and the metadata associated with the retained file. The file conversion module 106 may store the validation EDC in the database 158. In an example, the database 158 though shown outside the restoration system 100 may reside inside the restoration system 100.

In addition, at an instance of conversion of the file into the retained file, the file conversion module 106 may store an original version of the retained file in the trusted backup system 156 as a backup copy. The backup copy is created at the instance to ensure that the backup copy is made of the same version of the retained file and any modification or corruption may not take place. In an example, the file conversion module 106, while storing the backup copy, may generate a backup EDC for the backup copy of the retained file. The file conversion module 106 may associate the backup EDC with the backup copy of the retained file while storing the backup copy in the trusted backup system 156. In an example, the backup EDC is generated for the entire content of the backup copy as well as the metadata of the retained file.

In an implementation, the generation of the back-up copy of the retained file may be based on applicability of a restoration policy on the retained file. The restoration policy may define conditions for restoring or not restoring corrupted retained files. In an example, the restoration policy may indicate that one hour after conversion of the file into a retained file, the automatic restoration can be applicable. For example, at the instance of placing the retained file in the retained FS, the file conversion module 106 may check for applicability of the restoration policy on the retained file. If no restoration policy is defined for the retained file, the file conversion module 106 may not create the backup copy of the retained file. Therefore, the restoration system 100 of the present subject matter reduces storage space by selectively taking backup of files as may be defined in the restoration policy. The restoration policy may be defined for the different retained files, for example, at the time of deployment of the restoration system 100. In an example, the restoration policy may be modified by the administrator. In an example, single restoration policy may be applicable for all retained files or there may exist separate restoration policies for different retained files. The restoration policy may be stored in the database 158.

Once the retained files are stored in the retained FS, the retained files may remain unattended for long time. In order to check the validity of the retained files, the restoration system 100 may perform validation scans or checks on the retained files. The checks may be performed periodically at predefined time intervals. The time-intervals may be defined in accordance with internal policies of the organization. In an example, frequency of performing the checks may depend upon the content of the retained files. To perform the checks, the validation module 164 may generate a run-time EDC for each of the retained file. The run-time EDC may be generated based on the entire content and metadata of the retained file. In an example, the run-time EDC may be generated separately for the entire content and the metadata of the retained file. In another example, a combined run-time EDC may be generated for the entire content and the metadata of the retained file. The validation module 164 may also retrieve details, pertaining to the retained files, from the database 158. The details may include location of the trusted backup system 156, validation EDCs, and the restoration policies.

Upon retrieval of the details, the validation module 164 may compare the run-time EDC of each of the retained file with a corresponding validation EDC. For example, if separate validation EDCs, one based on the entire content and another based on the metadata, are generated by the file conversion module 106, the validation module 164 may compare the content based validation EDC with a content based run-time EDC and the metadata based validation EDC with a metadata based run-time EDC. When the content based run-time EDC and the metadata based run-time EDC of the retained file matches with the corresponding validation EDCs, i.e., content based validation EDC and the metadata based validation EDC, the retained file may be understood to be clean or incorrupt. On the other hand, if any of the run-time EDC, i.e., either the content based run-time EDC or the metadata based run-time EDC, of the retained file does not match with the corresponding validation EDC, the retained file may be understood to be corrupt.

In an example, if the run-time EDC match the validation EDC, the restoration module 108 may check whether or not a restoration policy is applicable for the retained file. In case the restoration policy is not applicable for the retained file, the restoration module 108 may invoke the backup module 170 to delete the backup of the retained file. Accordingly, by creating the backup copies of those retained files on which the restoration policy is applicable, the restoration system 100 facilitates in efficiently utilizing storage capacity of the trusted backup system 156.

In an example, the restoration module 108 may be coupled to the trusted backup system 156 for restoring the original versions of the corrupted retained files. Specifically, the backup module 170 may be authorized for restoring the backup copy of the corrupted retained file. Therefore, if the run-time EDC does not match with the validation EDC, the restoration module 108 may identify a restoration policy applicable for the corrupted retained file. In case the restoration policy is applicable for the retained file, the restoration module 108 may invoke the backup module 170 to communicate with the trusted backup system 156 to restore the backup copy of the retained file. In an example, once the backup copy is restored, the backup module 170 may create a restored EDC for the backup copy of the corrupted retained file. The restored EDC may be generated for either both or one of the content and the metadata of the backup copy of the corrupted retained file. The backup module 170 may compare the restored EDC with the validation EDC of the corresponding file.

Further, the backup module 170 may periodically update the status of the retained file in the database 158. For example, as per the frequency of the validation scans performed on the retained FS, the backup module 170 may update the status in the database 158. The status may be indicative of restoration of the retained file by the restoration module 108. For example, if the backup copy of the corrupted retained file is restored successfully by the restoration module 108, the backup module 170 may update the status of the retained file in the database 158, as "restoration successful". In case, the backup copy is not available in the trusted backup system 156, for example, when the restoration policy associated with the retained file does not indicate storage of the backup copy, the backup module 170 may update the status of the retained file as "restoration failed". In an implementation, the backup module 170 may also provide a reason for failure in restoring the backup copy.

Further, when any activity is performed by the restoration module 108 that may or may not result in restoration of the backup copy, the audit module 166 may maintain an audit trail of events that may be associated with the retained FS. An event may be understood as an action that is performed by a user on the retained FS. For example, an attempt to modify the content or metadata associated with a retained file may be considered as an event. In another example, an unsuccessful or successful attempt to restore a corrupted retained file may be considered as an event. The audit module 166 may maintain the audit trail of the events, in a sequential manner. In an example, the audit module 166 may log all the events, pertaining to the retained FS, since the creation of the retained file by the file conversion module 106. In addition, the audit trail may be used to track whether the corrupted retained file is restored by the backup module 170 or not.

In an example, the backup module 170 may, based on the audit trail and the status update, generate a report (not shown) indicating details about various events taking place in the retained FS. For example, the report may include information about the corrupted retained files that may be detected during validation scans, attempts to restore the corrupted retained files, successful restoration, failed restoration, and the like.

Accordingly, the restoration system 100 of the present subject matter can verify integrity of the retained files with enhanced accuracy. Further, the restoration system 100 can manage the retained files in an efficient manner, by restoring the original version corresponding to the identified corrupted retained files through the trusted backup system 156.

Figure 2A:
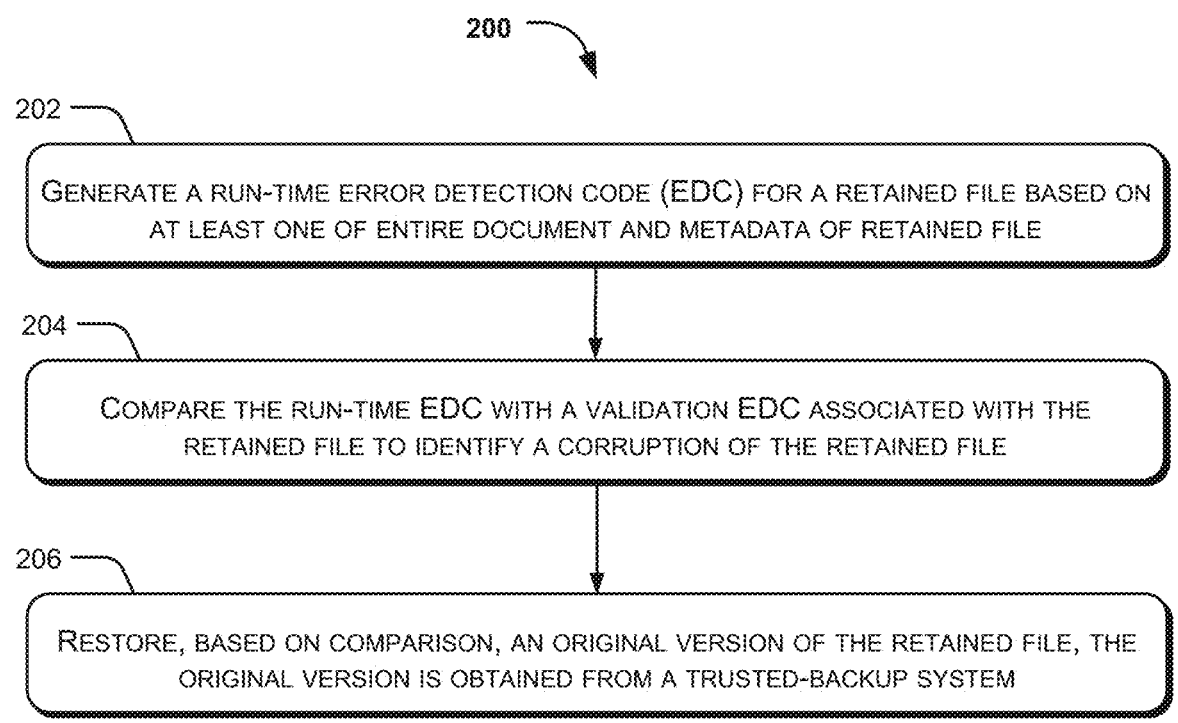
FIG. 2A illustrates a method for maintaining files in a retained file system, according to an example of the present subject matter.
Figure 2B:
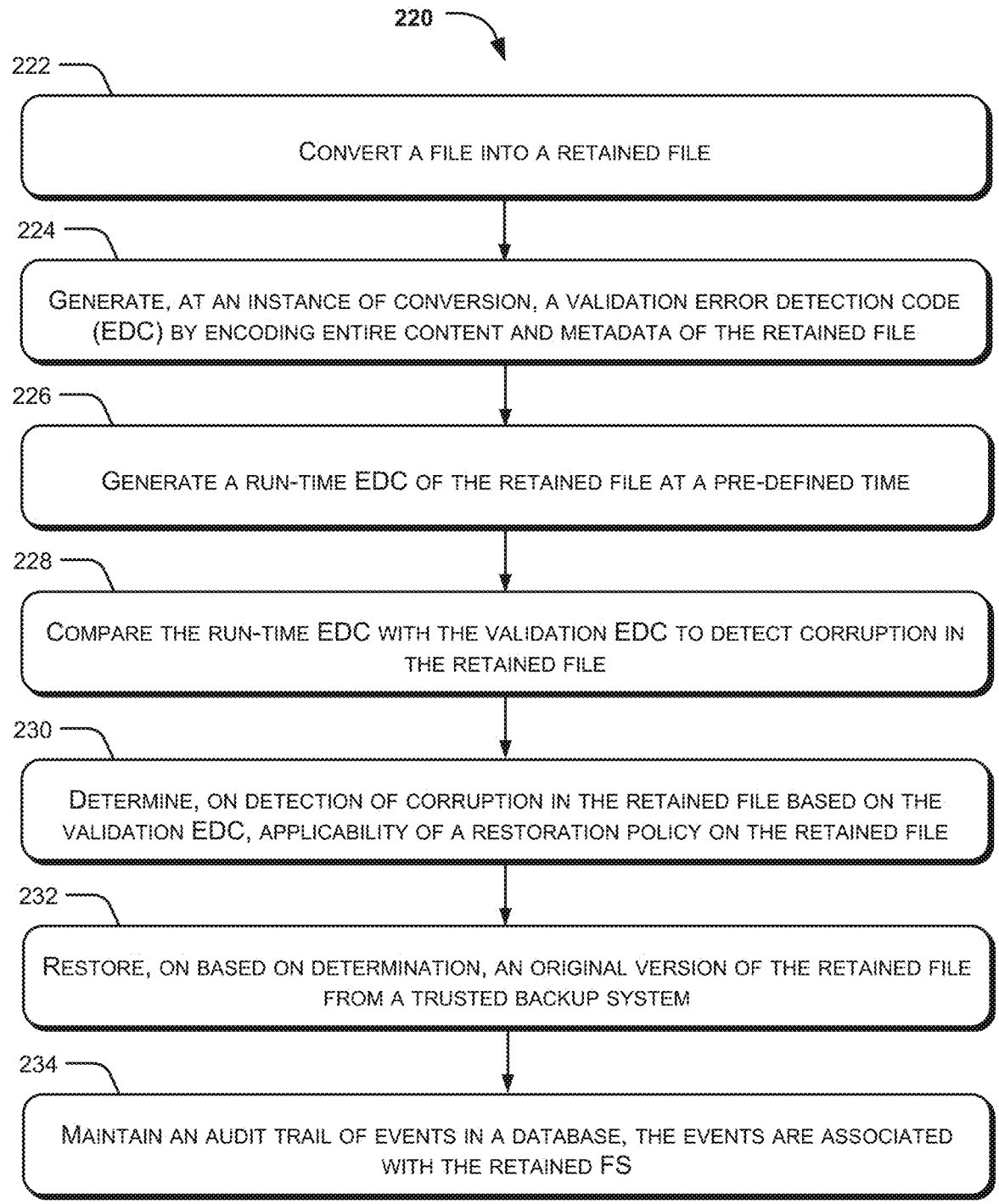
FIG. 2B illustrate method for maintaining files in a retained file system, according to other examples of the present subject matter.

FIGS. 2A and 2B illustrate methods 200 and 220 for maintaining files in a retained file system (FS), according to an example of the present subject matter. The order in which the methods 200 and 220 are described is not intended to be construed as a limitation, and some of the described method blocks can be combined in a different order to implement the methods 200 and 220, or an alternative method. Additionally, individual blocks may be deleted from the methods 200 and 220 without departing from the spirit and scope of the subject matter described herein. Furthermore, the methods 200 and 220 may be implemented in any suitable hardware, computer-readable instructions, or combination thereof.

The steps of the methods 200 and 220 may be performed by either a computing device under the instruction of machine executable instructions stored on a computer readable medium or by dedicated hardware circuits, microcontrollers, or logic circuits. Herein, some examples are also intended to cover computer readable medium, for example, digital data storage media, which are machine or computer readable and encode machine-executable or computer-executable instructions, where said instructions perform some or all of the steps of the described methods 200 and 220.

With reference to method 200 as depicted in FIG. 2A, at block 202, the method 200 includes generating a run-time error detection code (EDC) for a retained file based on at least one of entire content and metadata of the retained file. In an example, the run-time EDC may be understood as a checksum generated for the retained files. In an implementation, the validation module 164 may generate the run-time EDC at predefined time intervals. For example, the validation module 164 may perform validation scans on the retained files every month or twice in a year, based on the policies of the organization. The validation scan may be intended to check validity of the retained files.

For example, the validation scan confirms whether or not the content of the retained file is same as was stored. The validation scan may include retrieving the retained files and generating a checksum for the retrieved retained files. Such a checksum is referred to as the run-time EDC. Since the validation EDC is based on the entire content and the metadata of the retained file, the validation EDC may facilitate in determining integrity of the retained file in an efficient manner by detecting modifications that may occur at any portion of the retained file.

At block 204, the method 200 includes comparing the run-time EDC with a validation EDC associated with each of the retained files. The validation module 164 may compare the run-time EDC for each of the retained files with the validation EDC of the corresponding retained files to identify corruption of the retained file. In an example, if the run-time EDC, for the entire content and the metadata, is same as the corresponding validation EDCs, the retained file may be understood to be clean or uncorrupted. In another example, if there is mismatch between the run-time EDC, generated for either the entire content or the metadata, and the corresponding validation EDC of a retained file, the retained file may be understood to have gone bad.

At block 206, the method 200 includes restoring, based on the comparison, an original version of the corrupted retained file from a trusted backup system 156. In an example, the restoration module 108 may be communicatively coupled to the trusted backup system 156. In case of determination of the corrupted retained files, the restoration module 108 may invoke the backup module 170 to restore the original version or the backup copy of the corrupted retained file from the trusted backup system 156.

Referring to FIG. 2B, at block 222, the method 220 may include converting a file into a retained file. In an example, the file conversion module 106 may convert the file into the retained file. The retained file may be understood as an archived file of which the content and the metadata are not modifiable by users. Therefore, the conversion of the file into the retained file may be understood as change in properties of the file from modifiable to non-modifiable. Accordingly, the properties, such as a type of the file or the location of the file may not be modified. Additionally, in one example, upon conversion, the content of the file may also be made non-modifiable. Thus, the retained file may be accessible by users, such that the content is viewable but could not be edited. In an example, the file conversion module 106 may place the retained file in a retained FS that may include all retained files.

As shown in block 224, the method 220 may include generating, at an instance of the conversion, a validation EDC by encoding entire content of the retained file. In an example, the file conversion module 106, at the instance of placing the retained file in the retained FS, may generate the validation EDC for the retained file. The validation EDC may be generated for both the entire content and the metadata associated with the retained file. In an example, the file conversion module 106 may also store the original version of the retained file as a backup copy in the backup storage system 156. The backup copy is stored at an instance of conversion of the file into the retained file.

As depicted in block 226, the method 220 may include generating a run-time EDC of the retained file at a predefined time. In an example, the validation module 164 may perform validation scans at the time intervals that may be predefined by the organization. The run-time EDC is generated for the entire content and the metadata associated with the retained file.

At block 228, the method 220 may include comparing the run-time EDC with the validation EDC to detect corruption in the retained file. In an example, the validation module 164 may compare the run-time EDC for each of the retained files with the validation EDC of the corresponding retained files to identify corruption of the retained file. If the run-time EDC, for the entire content as well as the metadata, match the corresponding validation EDCs, the retained file may be understood to be clean or uncorrupted. In another example, if there is mismatch between the run-time EDC, for either the entire content or the metadata, and the validation EDC of a retained file, the retained file may be understood to have corrupted.

At block 230, the method 220 may include determining applicability of the restoration policy on the retained file. In an example, the restoration module 108 may ascertain the applicability of the restoration policy on the retained file. The restoration policy may dictate terms for restoring or not restoring original versions of the corrupted retained files.

At block 232, the method 220 may include restoring, based on the determination, an original version of the retained file from the trusted backup system 156. In an example, the restoration module 108 may invoke the backup module 170 to communicate with the trusted backup system 156 for restoring the original version of the corrupted retained file. In an example, the restoration policy may be such that the restoration may not be intended.

At block 234, the method 220 may include maintaining an audit trail of events in the database 158. The events may be associated with the retained FS. For example, the audit module 166 may maintain a log of events that may be associated with the retained FS. The log is maintained by the audit module 166 from the instance of conversion of the file into the retained file by the file conversion module 106.

Figure 3:
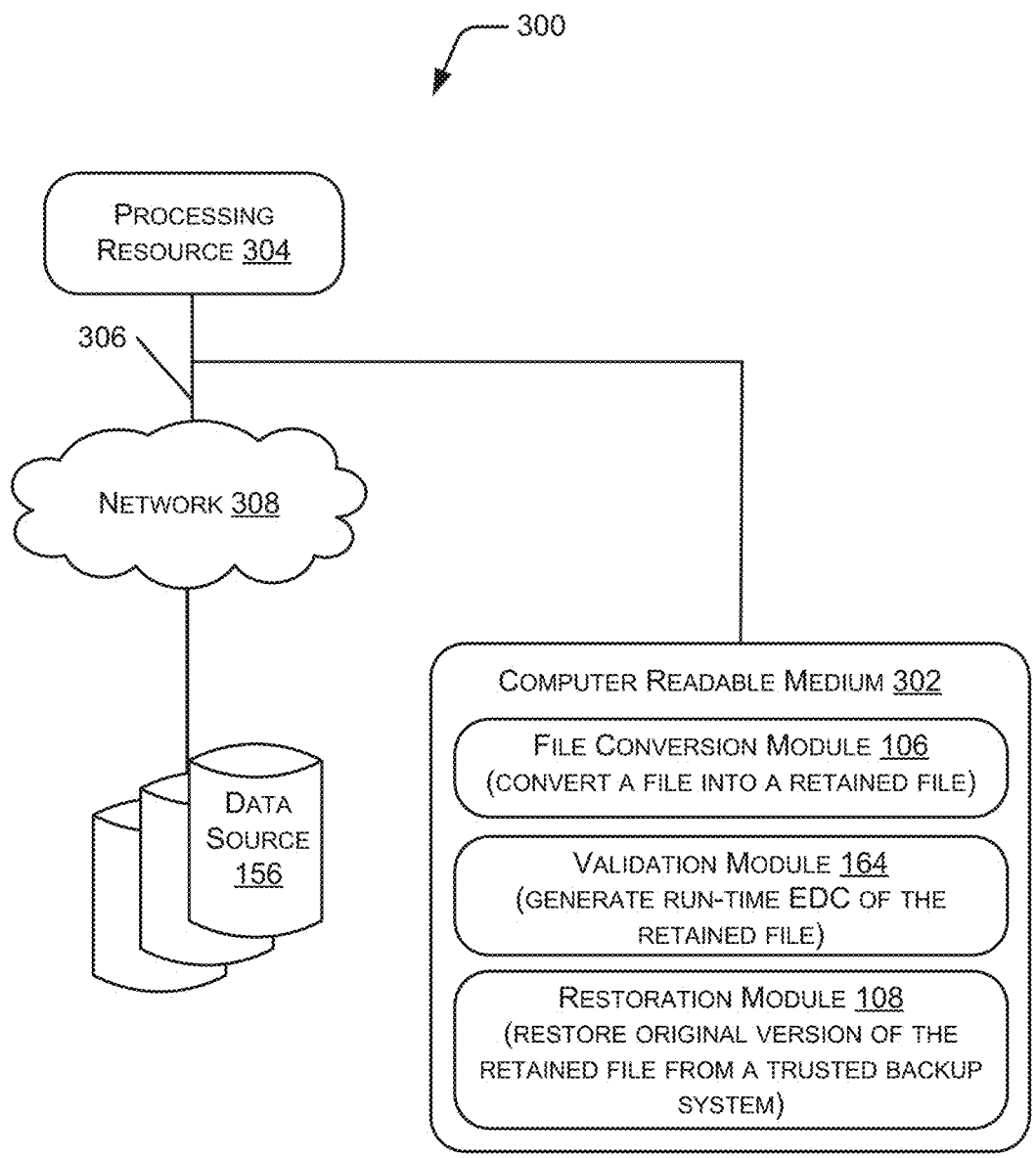
FIG. 3 illustrates a computer readable medium storing instructions for maintaining files in a retained file system, according to an example of the present subject matter.

FIG. 3 illustrates an example network environment 300 implementing a non-transitory computer readable medium 302 for maintaining files in a retained file system (FS), according to an example of the present subject matter. The network environment 300 may be a public networking environment or a private networking environment. In one implementation, the network environment 300 includes a processing resource 304 communicatively coupled to the non-transitory computer readable medium 302 through a communication link 306.

For example, the processing resource 304 can be a processor of a computing system, such as the restoration system 100. The non-transitory computer readable medium 302 can be, for example, an internal memory device or an external memory device. In one implementation, the communication link 306 may be a direct communication link, such as one formed through a memory read/write interface. In another implementation, the communication link 306 may be an indirect communication link, such as one formed through a network interface. In such a case, the processing resource 304 can access the non-transitory computer readable medium 302 through a network 308. The network 308 may be a single network or a combination of multiple networks and may use a variety of communication protocols.

The processing resource 304 and the non-transitory computer readable medium 302 may also be communicatively coupled to data sources 156 over the network 308. The data sources 156 can include, for example, databases, computing devices, and the trusted backup system from where original version or backup copies of corrupted retained files may be restored. The data sources 156 may be used by the database administrators and other users to communicate with the processing resource 304.

In one implementation, the non-transitory computer readable medium 302 includes a set of computer readable instructions, such as the file conversion module 106, the validation module 164, and the restoration module 108. The set of computer readable instructions, referred to as instructions hereinafter, can be accessed by the processing resource 304 through the communication link 306 and subsequently executed to perform acts for network service insertion.

For discussion purposes, the execution of the instructions by the processing resource 304 has been described with reference to various components introduced earlier with reference to description of FIGS. 1A and 1B.

In an example, on execution by the processing resource 304, the file conversion module 106 may generate a validation EDC for a file based on entire content of the file. The validation EDC may be understood as a checksum that may be based on the content and the metadata of the retained file. The file conversion module 106 may generate the validation EDC at an instance of placing the file in a retained FS. The retained file may be understood as a file, the content and metadata of which is non-modifiable by users. In an example implementation, the file creation module 106 may store the validation EDC in the database 158 that may be associated with the retained FS. Further, the validation module 164 may check the integrity of the file in the retained FS at predefined time intervals. In an example, the validation module 164 may perform validation scans at predefined time intervals to check the integrity of the files stored in the retained FS. Integrity of a file may be understood as consistency and accuracy of the data that may be stored in the file. To do so, the validation module 164 may generate run-time EDC for each of the retained file in the retained FS. In an example, the run-time EDC may be generated for the entire content and the metadata of the retained file. The validation module 164 may thereafter compare the run-time EDC of each of the retained file with the corresponding validation EDC.

In case there is a mismatch between the run-time EDC and the validation EDC, i.e., either the run-time EDC based on the entire content or the run-time EDC based on the metadata did not match the corresponding validation EDCs, the retained file may be considered as corrupt. Upon detection of the corrupted retained file, the restoration module 108 may restore an original version of the corrupted retained file from a trusted backup system 156. In an example, the restoration module 108 may invoke the backup module 170 to restore the original version or the backup copy of the retained file.

Although implementations of maintaining files in a retained file system have been described in language specific to structural features and/or methods, it is to be understood that the present subject matter is not necessarily limited to the specific features or methods described. Rather, the specific features and methods are disclosed and explained in the context of a few implementations for maintaining files in a retained file system.

We claim:

1. A method comprising:
   converting, by the processor, a file into a retained file, wherein the converting includes changing properties of the file to become non-modifiable in the retained file;

generating, by a processor, a validation error detection code (EDC) based on entire content of the retained file while placing the retained file in a retained file system;

storing, by the processor, an original version of the retained file as a backup copy at a trusted backup system communicatively coupled to the retained file system via a network and at an instance of converting the file into the retained file, wherein the original version is a version of the file before being converted into the retained file;

while storing the original version as the backup copy, generating by the processor a backup EDC for the entire content of the backup copy and associating the backup EDC with the backup copy in the trusted backup system;

generating, by the processor during an integrity check occurring subsequent to the generating the validation EDC, a run-time EDC based on entire content of the retained file in the retained file system;

comparing, by the processor, the run-time EDC with the validation EDC associated with the retained file to identify a corruption of the retained file when the run-time EDC does not match the validation EDC; and restoring, by the processor and upon identification of corruption of the retained file, the original version of the retained file in the retained file system from the backup copy of the trusted backup system, wherein the backup copy does not have the corruption or a modification relative to the original version of the retained file.

2. The method as claimed in claim 1 further comprising:
determining, on identifying a corruption of the retained file, by the processor, applicability of a restoration policy on the retained file, wherein the restoring is based on the applicability of the restoration policy.

3. The method as claimed in claim 2 further comprising, based on the determination, updating, by the processor, status of the retained file in a database associated with the retained file system, wherein the status indicates successful restoration or failed restoration of the retained file.

4. A restoration system comprising:
a processor; and
a non-transitory computer readable medium storing instructions that, when executed, cause the processor to:
  convert a file to a retained file by changing properties of the file to become non-modifiable in the retained file,
  generate a validation error detection code (EDC) based on entire content of the retained file, wherein the validation EDC is generated at an instance of placing the retained file in the retained file system,
  at the instance of placing the retained file in the retained file system, store an original version of the retained file as a backup copy at a trusted backup system communicatively coupled to the retained file system via a network, where the original version is a version of the file before being converted into the retained file,
  while storing the original version as the backup copy, generate a backup EDC based on the entire content of the backup copy and associate the backup EDC with the backup copy in the trusted backup system,
  generate, during an integrity check subsequent to generation of the validation EDC, a run-time EDC based on entire content of the retained file placed in the retained file system,
  compare the run-time EDC with the validation EDC to detect corruption of the retained file when the run-time EDC does not match the validation EDC, and
  restore, on detection of corruption in the retained file based on comparison of the run-time EDC and the validation EDC, the original version of the retained file from the backup copy of the trusted backup system, wherein the backup copy does not have the corruption or a modification relative to the original version of the retained file.

5. The restoration system as claimed in claim 4, wherein the non-transitory computer readable medium stores instructions that, when executed, cause the processor to determine applicability of a restoration policy on the retained file, upon detection of corruption in the retained file.

6. The restoration system as claimed in claim 4, wherein the integrity check is at a predefined time.

7. The restoration system as claimed in claim 4, wherein the non-transitory computer readable medium stores instructions that, when executed, cause the processor to verify whether the backup copy is corrupt, based on the backup EDC.

8. The restoration system as claimed in claim 4, wherein the non-transitory computer readable medium stores instructions that, when executed, cause the processor to maintain an audit trail of events in a database associated with the retained file system.

9. The restoration system as claimed in claim 4, wherein the validation EDC is further based on metadata of the retained file.

10. A non-transitory computer-readable medium comprising computer readable instructions that, when executed, cause a restoration system to:
  convert a file into a retained file, wherein the converting includes changing properties of the file to become non-modifiable in the retained file;
  generate a validation error detection code (EDC) based on entire content of the retained file at an instance the file is placed in a retained file system as a retained file;
  at the instance of placing the retained file in the retained file system, store an original version of the retained file as a backup copy at a trusted backup system communicatively coupled to the retained file system via a network, where the original version is a version of the file before being converted into the retained file;
  while the original version is being stored as the backup copy, generate a backup EDC based on the entire content of the backup copy and associate the backup EDC with the backup copy in the trusted backup system,
  perform an integrity check of the retained file in the retained file system at predefined time intervals, wherein the integrity check includes:
    generating a run-time EDC based on entire content of the retained file in the retained file system, and
    comparing the run-time EDC with the validation EDC to detect corruption of the retained file when the run-time EDC does not match the validation EDC; and
  restore the original version of the retained file from the backup copy of the trusted backup system, upon detection of corruption in the retained file, wherein the backup copy does not have the corruption or a modification relative to the original version of the retained file.

11. The method as claimed in claim 1, wherein the validation EDC is a checksum of the entire content of the retained file.

12. The method as claimed in claim 1 further comprising:
generating a metadata-based validation EDC based on metadata of the retained file while the retained file is placed in the retained file system;
generating, during the integrity check, a metadata-based run-time EDC based on metadata of the retained file placed in the retained file system; and
comparing the metadata-based validation EDC with the metadata-based run-time EDC,
wherein the corruption is identified either when the run-time EDC does not match the validation EDC or when the metadata-based run-time EDC does not match the metadata-based validation EDC.

13. The method as claimed in claim 1 further comprising verifying whether the backup copy is corrupt based on the backup EDC.

14. The method as claimed in claim 1 further comprising maintaining an audit trail of events in a database associated with the retained file system.

* * * * *